INVENTORS
STANLEY F. KADRON
JOHN M. TEWKSBURY

United States Patent Office 3,150,373
Patented Sept. 22, 1964

3,150,373
TEST CIRCUIT FOR AUTOMATIC
DIRECTION FINDER
Stanley F. Kadron, Owings Mills, and John M. Tewksbury, Lutherville, Md., assignors to The Bendix Corporation, Towson, Md., a corporation of Delaware
Filed Jan. 9, 1963, Ser. No. 250,307
12 Claims. (Cl. 343—117)

The present invention relates to automatic radio direction finding equipment and more particularly to a system for permitting testing of such equipment while in flight.

Automatic direction finding (ADF) equipment has been in use as a navigational aid for many years and has been found to be very advantageous, especially since it does not require the broadcasting of any special signal, but operates very satisfactorily by tuning to commercial radio stations. A considerable need has been felt, however, for a means which would permit simple and easy testing of such equipment while in flight. A number of techniques have been developed which have had some use as a checking means. One such technique has involved having the pilot tune a known station to establish its bearing relative to his known position. If the direction finding equipment agrees with the angle between the stations shown on a map, the equipment may be assumed to be operating properly. Another technique is simply to turn the aircraft through a known number of degrees and to see if the needle on the ADF equipment follows the same number of degrees. Sometimes two sets have been provided so that one could be compared with the other. The fact that these techniques exist is ample proof of a continuing need for simple and easy means for accomplishing in flight testing of ADF equipment. It has long been recognized that lack of pilot confidence in his navigational equipment leads to some inefficiency. It is, therefore, an object of the present invention to provide a means permitting a substantially complete check on the operation of ADF equipment while in flight.

It is another object of the present invention to provide an ADF testing means which accomplishes the above object and which is comparatively simple and straightforward structurally and which may be easily adapted to existing designs.

It is a further object of the present invention to provide an ADF testing system in which a failure of said system would not also result in a failure of the direction finding device.

Figure 1:
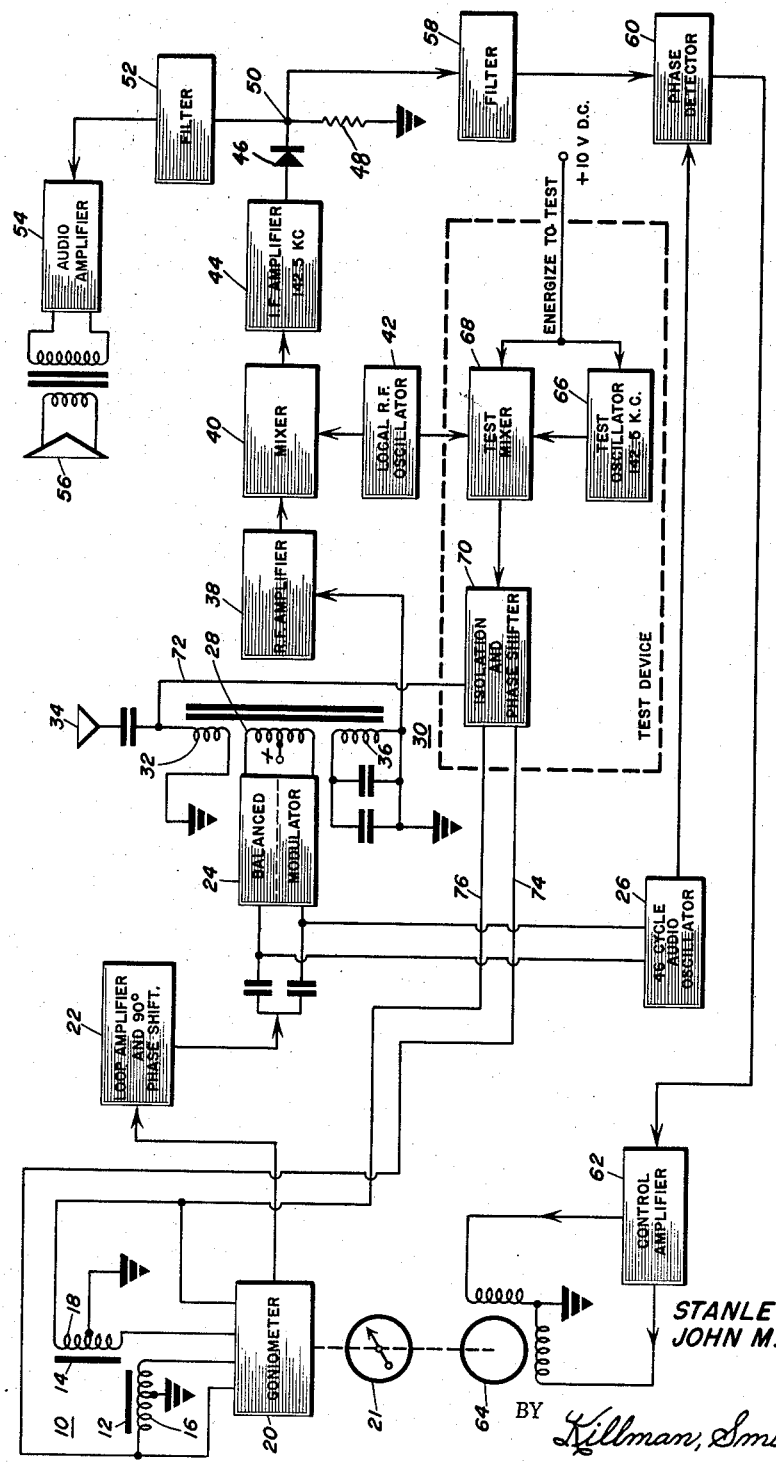
Figure 2:
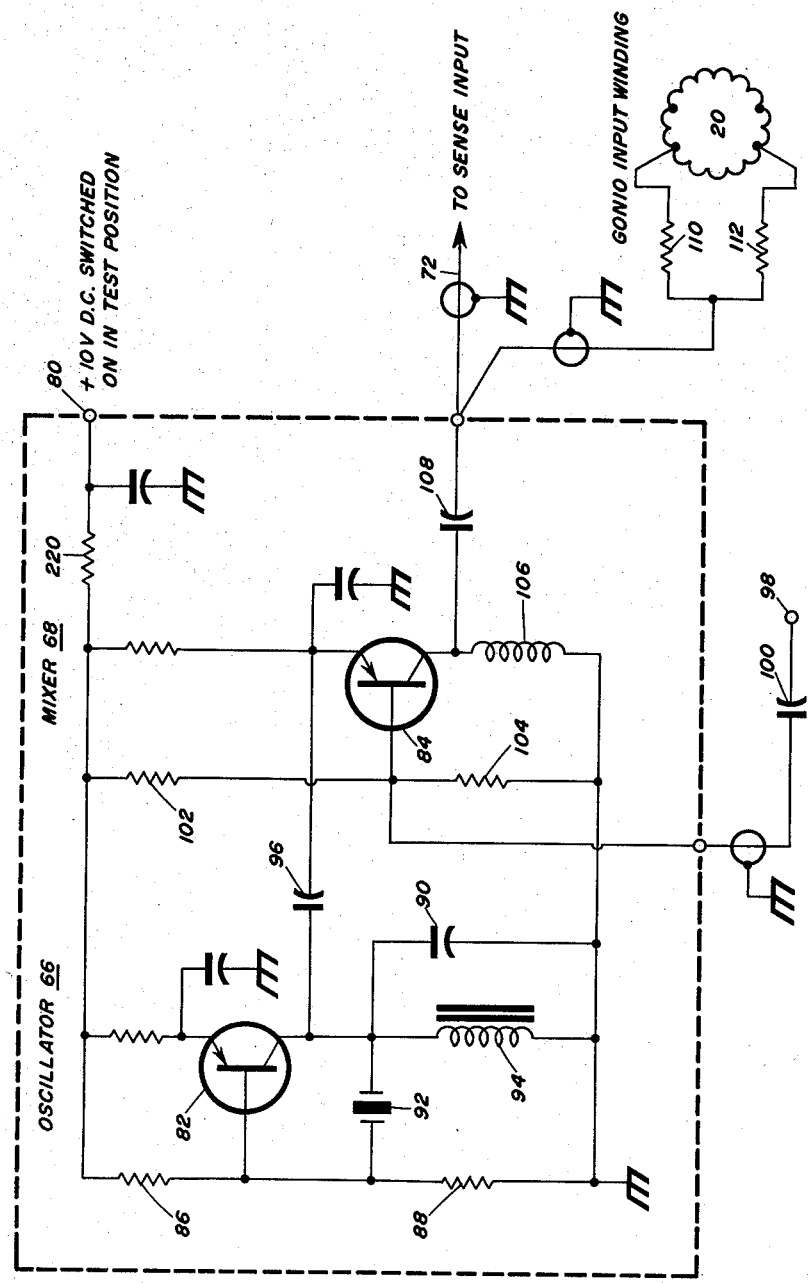

Other objects and advantages will become apparent from the following specification taken in connection with the accompanying drawing, in which:

FIG. 1 is a schematic block diagram of a typical ADF system with our testing means incorporated therein; and FIG. 2 is a schematic diagram of our testing circuit.

Referring now to FIG. 1, a directional receiving antenna 10 is shown in the form of a pair of ferrite antenna members 12 and 14 having windings 16 and 18, respectively, associated therewith. These antenna members are physically oriented at an angle of 90° from each other and constitute an antenna having a directional pattern substantially the same as that of the typical loop antenna. Such patterns typically have a null which the automatic direction finding equipment is designed to seek. The outputs of the windings 16 and 18 are supplied to a goniometer 20 which typically includes a stator consisting of a ferrite ring with a series of windings thereon which are connected to windings 16 and 18, and a rotor consisting of a ferrite member located within the interior of the ferrite ring and having a winding thereon. The rotor and its winding tend to produce an output varying in phase and magnitude with the direction and magnitude of the departure of the bearing of the aircraft from the bearing of the transmitting station. A pointer 21 attached to the rotor provides a reading on a dial in the pilot's instrument panel indicating the bearing of the received signal. Unless the pointer 21 is directly on the bearing of the station, an output is supplied to a radio frequency (R.F.) amplifier 22 which, in addition to amplifying the output signal, also introduces a 90° phase shift. The phase shift is necessary because of the fact that the signal from the directional antenna will lead or lag that of the sense antenna (to be described below) with which the directional antenna signal is compared.

The amplified and phase shifted signal from the R.F. amplifier 22 is applied in parallel to a balanced modulator 24 to which is also applied in push-pull a 46 cycle sine wave from an audio oscillator 26.

The output of the balanced modulator, which is the radio frequency output of amplifier 22 modulated by a 46 cycle signal, appears on a primary winding 28 of a transformer 30, the phase of this modulated signal varying as the phase of the output signal of amplifier 22. To a second primary winding 32 is applied the output of a non-directional sense antenna 34. The effect of adding in this signal is that the signal on one-half of winding 28 is augmented and that on the opposite half is diminished for a given phase output of goniometer 20. The tuned secondary winding 36 of this transformer applies the combined outputs of the balanced modulator and sense antenna to an R.F. amplifier 38. The output of this amplifier is supplied to a mixer 40 where it is mixed with the output of a local R.F. oscillator 42 to produce an intermediate frequency (I.F.) signal which is amplified in an I.F. amplifier 44 and detected in a detector including a diode 46 connected to ground through a resistor 48. The output of diode 46 appears at a junction point 50 and consists of a 46 cycle signal modulated by the combined audio signals from antennas 10 and 34, while audio signal has a phase relationship as established by the output of the goniometer 20.

A filter 52 passes the audio signal to an audio amplifier 54, where it is amplified and supplied to a speaker 56. An additional filter 58 discriminates against the audio signal, but permits the 46 cycle bearing signal to be supplied to a phase detector 60. The phase detector 60 also receives a 46 cycle input from the audio oscillator 26 and these inputs are compared and an output supplied to the control amplifier 62 varying in polarity according to the phase of the signal passing filter 58. Control amplifier 62 amplifies the signal fed to it from phase detector 60 and supplies it to one or the other of the control windings of a two-phase motor 64 which acts to drive the rotor of the goniometer 20 toward a position where it will have zero output.

The system thus far described is typical of ADF systems presently in use and has been described only generally because of the need to relate the testing device to its environment. The testing device appears in FIG. 1 as the part of the system which is enclosed by the dotted line. The theory of the testing device is that if a known reference bearing can be supplied to the antennas of the system, it should provide a reading of the known bearing on the pointer 21. If any other reading appears, this may be considered to show an error in the system and also to indicate the magnitude and direction of the error.

The intermediate frequency used in the main receiver could be any suitable value, but typically has been chosen as 142.5 kc. Thus the local R.F. oscillator 42 produces an output which is the frequency of the R.F. carrier input, such as 1000 kc. for example, displayed by the amount of the intermediate frequency selected (1142.5 kc.). When these signals are combined in the mixer 40, the carrier frequency is changed to the intermediate frequency. When the testing device is energized, a test oscillator 66 operates to produce an output at 142.5 kc. which is supplied to a test mixer 68. Inasmuch as the test mixer also receives an input signal from the local R.F. oscillator, it produces an output which has a frequency exactly the same as that of the R.F. carrier supplied from amplifier 38 to mixer 40 (1000 kc.). This signal is then fed to an isolation and phase shifting circuit 70, from whence it is supplied through a wire 72 to the sense antenna input and through wires 74 and 76 to the loop antenna terminals in such phase that they provide an input to the goniometer 20, the same as that of the reference bearing. With the system thus far described, it is apparent that one of the easiest reference bearings to select would be 45° since the same signal supplied to both of the loop antenna terminals would give this reading.

The details of a typical testing circuit are shown in the schematic diagram, FIG. 2.

When the test circuit is energized, a direct current voltage (+10 v.) is supplied to a terminal 80, which effectively energizes the test oscillator transistor 82 and the test mixer transistor 84. The base of transistor 82 is biased to a desired value by means of resistors 86 and 88. Connected in base-collector circuit of transistor 82 is a resonant circuit including a capacitor 90 and an inductor 94, said circuit being controlled to 142.5 kc. by means of a crystal 92. The output from the oscillator transistor 82 appears on its collector and is coupled through a capacitor 96 to the emitter of the mixer transistor 84. The signal from the local R.F. oscillator 42 is supplied from a terminal 98, through a coupling capacitor 100 to the base of mixer transistor 84. Resistors 102 and 104 are conventional bias resistors for the base of transistor 84. The collector of transistor 84 is connected to ground through a winding 106 which has very little resistance to D.C. but substantial impedance to radio frequency signals in the range of the ADF system. The output from the collector circuit of transistor 84 is coupled through a small capacitor 108 to the sense antenna circuit (wire 72) and, through equal resistors 110 and 112 of substantial value, to the terminals of each of antenna windings 16 and 18 (see FIG. 1).

During flight, the pilot may tune a given station and the signal from this station is received on the sense antenna 34 and the directional loop antenna. Unless the goniometer happens to be pointing to the bearing of the station tuned, a radio frequency output will be supplied to the amplifier 92 which has a particular phase relationship depending on the direction of the departure from the bearing presently indicated. This output is combined with that of the 46 cycle generator 26 in the balanced modulated 24 and this modulated signal is further combined with that from the sense antenna 34 before being supplied to the R.F. amplifier 38. This amplified radio frequency signal is supplied to the mixer 40 where the carrier is changed to the intermediate frequency (142.5 kc.). This signal is further amplified and detected with the output of the detector being supplied to the audio system and also to the phase detector 60. The phase detector provides an output to the control amplifier 62 which causes it to provide a signal of proper polarity to rotate the two-phase motor 64 either clockwise or counter-clockwise, depending upon the phase of the output signal of the goniometer, such that the goniometer output is reduced to zero.

Should the pilot desire to test the ADF system, he needs only to operate a switch or a button on his instrument panel to energize the test oscillator 66 and the test mixer 68. The test oscillator provides a 142.5 kc. signal to the mixer which also receives the output from the local R.F. oscillator 42. The output of the mixer, which is the signal appearing at the collector of transistor 84 is connected through capacitor 108 and lead 72 to the sense antenna winding 32 and also through the resistors 110 and 112 to the windings of the goniometer. By supplying identical signals to the sense antenna circuit and to each set of goniometer windings, the pilot knows that he should get a 45° bearing indication. If he gets any other reading, a malfunction is indicated.

The system might have been designed to provide a very large signal on one antenna winding and a zero signal on the other, thereby giving a standard test bearing of zero or ninety degrees. Aside from a general policy of avoiding the use of zero readings on self-testing circuits (which in many cases would not distinguish from some malfunctions) the 45° system has a further advantage. One possible malfunction which may occur is a short-circuit between the lead and the grounded cables connecting the antenna winding to the goniometer. Obviously, a system requesting a zero or ninety degree indication might not indicate this malfunction.

While only a single embodiment has been shown and described herein, it is recognized that modifications may be made within the scope of the present invention.

We claim:

1. In an automatic direction finding system including a non-directional sense antenna;
    a directional antenna having a pattern including a null;
    a goniometer and a radio frequency amplifier having tuning means and phase shifting means including means indicating a bearing and means producing a radio frequency output signal varying in phase and magnitude with the direction and magnitude of the departure of the indicating means from the bearing of the signal selected by said tuning means;
    an audio oscillator having a uniform low frequency output;
    a balanced modulator receiving and combining the outputs of said radio frequency amplifier and said audio oscillator;
    signal combining means including a transformer having a center tapped primary winding connected to said modulator, a second primary winding connected to said sense antenna, and a secondary winding;
    receiver means connected to said secondary winding including tuned means for amplifying the output of said signal combining means including a local radio frequency oscillator and a mixer for converting said radio frequency signal to an intermediate frequency signal and intermediate frequency amplification means and detection means for said signal;
    a phase detector and means supplying the component of said detected signal having said given low frequency output to said phase detector, and means connecting the output of said audio oscillator to said phase detector, such that a direct current output is provided having a polarity varying with the phase difference between said signals supplied to said phase detector; and
    a reversible motor connected to said goniometer and means connecting said direct current signal to said motor:
    a testing system comprising a test oscillator operating at said intermediate frequency;
    a test mixer connected to receive and mix said intermediate frequency signal from said test oscillator with the signal from said local radio frequency oscillator, thereby producing a radio frequency output signal at the same frequency as that to which said radio frequency amplifier is tuned;
    and means connecting said test mixer output to said second primary winding and to said directional antenna circuit to produce a predetermined bearing indication on said bearing indicating means.

2. In an automatic direction finding system including a directional antenna;
    a goniometer and a radio frequency amplifier having tuning means connected to said antenna including bearing indicating means and means producing an output signal varying in phase and magnitude with the direction and departure of the bearing indicating means from the signal selected by said tuning means;

an audio oscillator for generating a uniform low frequency signal;

a non-directional sense antenna;

modulation means including a transformer for combining the outputs of said radio frequency amplifier, said oscillator and said sense antenna;

a superheterodyne radio receiver connected to said modulation means including a local radio frequency oscillator, tuning means operable in synchronism with the tuning means of said radio frequency amplifier, a detector, and an audio amplifier;

phase detecting means connected to receive and compare the outputs of said detector and said audio oscillator;

and motor means connected to said goniometer and controllable by the output of said phase detector such that said output tends to drive said motor means in a direction to reduce the output of said goniometer to zero;

a testing system comprising a test oscillator operating at the intermediate frequency of said receiver;

a mixer connected to receive the outputs of said test oscillator and said local radio frequency oscillator and to produce a radio frequency output of the same frequency as that tuned by said radio frequency amplifier;

and means connecting the output of said mixer to the circuits of said sense antenna and said directional antenna and goniometer to produce a predetermined indication on said bearing indicating means.

3. An automatic direction finding system as set forth in claim 2 wherein said test oscillator includes a transistor with a crystal controlled resonant circuit connected thereto and said mixer includes a transistor having said test oscillator and said local radio frequency oscillator connected thereto and having its output connected through a capacitor to the circuit of said sense antenna and through said capacitor and resistance means to said directional antenna.

4. An automatic direction finding system as set forth in claim 3 wherein said goniometer includes an input winding for each of two directions of motion and said resistance means includes resistors of substantially equal value connected between said capacitor and each of said windings.

5. In an automatic direction finding system, an antenna device having a directional pattern including a null, means responsive to an output signal from said directional antenna device generating a voltage waveform comprising a radio frequency carrier wave modulated at an audio frequency, said modulation having one phase when said null is positioned on one side of the direction of origin of a received signal and having an opposing phase when said null is positioned on the other side of said direction;

means including a local radio frequency oscillator for converting said radio frequency carrier to an intermediate frequency carrier;

detector means for removing said intermediate frequency carrier from said audio frequency;

and phase discriminating means including motor means for driving said antenna device in a direction toward said null;

a testing device including a test oscillator operating at said intermediate frequency;

a mixer connected to receive the outputs of said test oscillator and said local radio frequency oscillator to produce an output of the same frequency as said radio frequency carrier;

and means connecting the output of said mixer to said antenna device and to said first named means.

6. An automatic direction finding system as set forth in claim 5 wherein said test oscillator includes a crystal controlled resonant circuit and said mixer includes a transistor having a plurality of electrodes, the output of said crystal controlled resonant circuit being supplied to one of said electrodes, the output of said local oscillator being supplied to another of said electrodes, and the output of said mixer appears at the third of said electrodes, said output being connected through a capacitor to the circuit of said non-directional antenna and through said capacitor and resistance means to said directional antenna means.

7. In an automatic direction finding system, an antenna device having a directional pattern including a null, means for amplifying and shifting the phase of the received signal, a balanced modulator and means applying said amplified and phase shifted signal to said balanced modulator, an audio oscillator and means applying the output of said audio oscillator to said balanced modulator in phase opposition, a non-directional antenna and means combining the output of said non-directional antenna with the output of said balanced modulator thereby providing a resultant waveform having the frequency of the received signal and modulated with the output of said audio oscillator, the phase of said modulation being in one sense when said null is on one side of the direction of origin of said signal and in the opposite sense when the said null is on the other side of said direction;

means including a local radio frequency oscillator for converting the signal frequency of said resultant waveform to an intermediate frequency;

a detector and means applying said converted signal to said detector;

phase discriminating means including motor means for driving said antenna device and means simultaneously applying the outputs of said audio oscillator and said detector to said phase discriminating means such that said motor means drives said antenna device in a direction toward said null;

a testing device including a test oscillator operating at said intermediate frequency;

a mixer connected to receive the outputs of said test oscillator and said local radio frequency oscillator to produce an output of the same frequency as said received signal;

and means connecting the output of said mixer to said antenna device and to the circuit of said non-directional antenna.

8. An automatic direction finding system as set forth in claim 7 wherein said test oscillator includes a crystal controlled resonant circuit and said mixer includes a transistor having a plurality of electrodes, the output of said crystal controlled resonant circuit being supplied to one of said electrodes, the output of said local oscillator being supplied to another of said electrodes, and the output of said mixer appears at the third of said electrodes, said output being connected through a capacitor to the circuit of said non-directional antenna and through said capacitor and resistance means to said directional antenna means.

9. An automatic direction finding system as set forth in claim 8 wherein said directional antenna means includes a goniometer having input windings for each of two directions of rotation and said resistance means includes resistors of substantially equal value connected between said capacitor and each of said windings.

10. In an automatic direction finding system having directional antenna means including means physically movable to produce a null and a ratio frequency amplifier including tuning means, an audio oscillator for generating a uniform low frequency signal, a non-directional antenna, signal combining means for combining the outputs of said audio oscillator, tunable radio frequency amplifier and non-directional antenna, a radio receiver including a local radio frequency oscillator, means producing an intermediate frequency carrier, and a detector;

and phase discrimination means connected to said detector and said audio oscillator including motor means for driving said antenna device in a direction toward said null;

a testing device including a test oscillator operating at said intermediate frequency;

a mixer connected to receive the outputs of said test oscillator and said local radio frequency oscillator to produce an output of the same frequency as that tuned in said radio frequency amplifier;

and means connecting the output of said mixer to said directional antenna means and to said non-directional antenna.

11. An automatic direction finding system as set forth in claim 10 wherein said test oscillator includes a crystal controlled resonant circuit and said mixer includes a transistor having a plurality of electrodes, the output of said crystal controlled resonant circuit being supplied to one of said electrodes, the output of said local oscillator being supplied to another of said electrodes, and the output of said mixer appears at the third of said electrodes, said output being connected through a capacitor to the circuit of said non-directional antenna and through said capacitor and resistance means to said directional antenna means.

12. An automatic direction finding system as set forth in claim 11 wherein said directional antenna means includes a goniometer having input windings for each of two directions of rotation and said resistance means includes resistors of substantially equal value connected between said capacitor and each of said windings.

References Cited in the file of this patent
UNITED STATES PATENTS
2,840,814    Hemphill et al. _____ June 24, 1958